United States Patent Office 2,870,132
Patented Jan. 20, 1959

---

2,870,132

LOW VISCOSITY SULFURIZED TALL OIL AND PROCESS FOR MAKING THE SAME

Carroll B. Hall, Pennington, Newell A. Perry, Hamilton Square, and Max F. Zullig, Princeton, N. J., assignors to Ridbo Laboratories, Inc., Trenton, N. J., a corporation of New Jersey No Drawing. Application January 22, 1957
Serial No. 635,131

4 Claims. (Cl. 260—97.5)

This invention relates to a new composition of matter, namely, low viscosity sulfurized tall oil and also to a method of producing the low viscosity material.

Sulfurized tall oil has been found to be an extremely useful additive in the compounding of elastomeric materials as a nerve reducing agent, and as an extender, and as a fortifying agent.

The procedures heretofore used for the production of sulfurized tall oil, as shown, for example, in Kalman's United States Patent No. 2,480,478, have formed a material having exceptionally high viscosity, i. e., in the range of 300,000 to 800,000 centipoises at room temperature.

Materials which have such high viscosities do not flow freely at room temperature and in order to effectively handle and compound the high viscosity sulfurized tall oil with elastomers it is necessary to employ special equipment and techniques in order to first get the material into a state where it can be more readily handled and worked into the rubber.

By this invention we have discovered that if certain special processing conditions are observed and adhered to it is possible to produce sulfurized tall oil having a viscosity of less than 20,000 centipoises at room temperature and that the low viscosity material has vastly superior flow characteristics which permit it to be handled and incorporated in rubbers, both natural and synthetic, far more readily than the high viscosity materials heretofore used in rubber compounding.

Surprisingly, notwithstanding the fact that the product produced according to the present invention has a very low viscosity as compared with products employed in the prior art, nevertheless, the product still possesses the desirable compounding characteristics and can still be used as an effective agent for reducing the nerve of certain elastomers and as an extender and fortifying agent. Moreover, because of the relatively low viscosity, the benefits and advantages of the sulfurized tall oil as a rubber compounding agent may be obtained more readily and effectively than was possible heretofore.

In general, the method of this invention involves preheating tall oil to a temperature slightly above the melting point of sulfur, dispersing sulfur in the preheated tall oil, holding the reaction mass of melted sulfur dispersed in the tall oil at temperatures between 250° and 300° F. for a sufficient time to effect substantially complete reaction of the sulfur and tall oil and after the sulfur has reacted with the tall oil, cooling the reaction mass below about 190° F. before extensive polymerization can occur.

In carrying out the process of the present invention and in order to insure the production of the low viscosity material, it is necessary to employ either crude or refined tall oils which have a rosin acid content which is not greater than about 46%, preferably one in which the rosin acid content ranges from about 35% to 45%.

The tall oil is preferably preheated and maintained at a temperature slightly above the melting point of sulfur, for example at about 235°–250° F. while the sulfur is being dispersed and dissolved therein. If the temperature of the reaction mass is permitted to exceed 250° F. before the sulfur has been melted and completely dissolved therein there is a tendency to objectionably increase the viscosity of the reaction product.

The dispersal of the sulfur in the preheated tall oil can be effected in any suitable manner. We have found that the production of the low viscosity material is advantageously achieved when the sulfur is added as molten sulfur and dispersed by agitation in the preheated tall oil. By proceeding in this way it is possible to effect the complete dispersion and dissolution of the sulfur quickly, and at the same time the temperature of the reaction mass can be easily maintained within the preferred range until the sulfur is completely dissolved in the preheated tall oil.

Comparable results can also be achieved by adding unmelted sulfur to the preheated tall oil in increments over a period of time which will vary somewhat with the size of the batch. In such cases the most satisfactory results are achieved where succeeding increments are added at a rate whereby the reaction mass can be held at the constant desired temperature without the necessity of adding additional heat or of cooling the mass to control the exothermic reaction. Even where the sulfur is added in molten form, it is preferred to effect the addition rather slowly so as to minimize the possibility of uncontrollable exothermic reactions occurring.

When employing a tall oil having a rosin acid content of about 45% or less, it is preferred to add sulfur in an amount of from about 3 to 12% of the weight of the tall oil in that we have found that where the herein specified operating conditions are observed such quantities of tall oil and sulfur will provide a suitable low viscosity reaction product, and within this range an especially desirable reaction product is produced when about 9–10% sulfur is employed. Where lesser quantities of sulfur are employed, i. e., about 2% or less, the low viscosity material can be produced but there is a tendency for the rosin acids to crystallize out and the value of the material as a rubber compounding additive is thereby diminished. Where larger quantities of sulfur are employed, i. e., appreciably above 12% and especially above about 15%, the reaction product produced from these high sulfur content masses will have an undesirably high, usually upwards of about 100,000, centipoises.

After the sulfur has been melted and dissolved in the tall oil, the temperature of the reaction mass is raised to a temperature above 250° F. but not above about 300° F. Highly desirable sulfurized tall oils having a viscosity of the general order of about 10,000 centipoises are produced if the temperature of the mass is maintained below about 280° F. until all of the sulfur has been reacted with the tall oil provided the other specified processing conditions are also observed.

The time needed for completely reacting the sulfur and tall oil will vary considerably and will depend somewhat on the way in which the sulfur is added to the tall oil and the temperature conditions which prevail during the sulfur addition and reaction period. A good indication of when the reaction is complete can be had by running clarity point tests at various times during the reaction period. This is done by smearing a drop of the hot liquid from the reaction mass on a cold glass plate with a spatula or stirring rod and visually examining the smear for clarity. If it is milky or clouded, unreacted sulfur is present and reaction should be permitted to proceed further. After the clarity point has been reached, i. e., the smear is clear, substantially all of the sulfur will have been reacted with the tall oil. However, in order to insure that the sulfur is completely reacted and will not crystallize from the mass on standing, we have found it possible and desirable to maintain the reaction mass at the elevated reaction temperature for further periods of time, preferably about one hour after the clarity point is reached.

After the sulfur-tall oil reactions have gone to completion, the temperature of the mass should be brought down to below 190° F. as rapidly as possible. After the clarity point has been reached, and if the reaction mass is held at the reaction temperature for prolonged periods the viscosity of the end product will increase to an objectionable degree, apparently due to polymerization reactions. It is therefore preferred to cool the mass to a temperature of about 190° F. within about two hours after the point of clarity has been reached.

The following example illustrates one preferred mode of operating to produce low viscosity sulfurized-tall oil in accordance with the present invention.

900 grams of crude tall oil (45% rosin acid) were preheated to a temperature of about 240°–250° F. and maintained at this temperature for one hour. At 5 minute intervals throughout the hour previously referred to small increments of pulverized rhombic sulfur were added to the heated tall oil until a total of 81.75 grams of sulfur had been added, melted and dissolved by agitation in the tall oil. The temperature of the reaction mass was then raised to 270°–280° F. and held at that temperature. The clarity point was reached in 4 hours and 25 minutes. The mass was held at 270°–280° F. for still another hour and then cooled to 190° F. over the next succeeding hour. The sulfurized tall oil produced in this way had a viscosity of 9,700 centipoises at room temperature. It was a brown, tacky liquid having the consistency of molasses and has a less pronounced $H_2S$ odor than in the case of the previously known high viscosity materials.

We claim:

1. As a composition of matter, sulfurized tall oil containing 3 to 15% sulfur based on the weight of the tall oil which is substantially free of unreacted sulfur and which has a viscosity of less than 20,000 centipoises at room temperature.

2. The method for the production of sulfurized tall oil which comprises heating a tall oil which contains less than 46% by weight rosin acids to a temperature of 235° to 250° F., adding 3 to 12% by weight sulfur to the heated tall oil while maintaining the temperature of the mass above the temperature at which the sulfur melts, after all of the sulfur has been added to, melted, and dissolved in the reaction mass, raising the temperature of the mass to 270° to 280° F. and maintaining the mass at said temperature until the mass is substantially free of unreacted elemental sulfur as determined by clarity point tests, and within two hours after reaching the clarity point, cooling the reaction mass to 190° F.

3. The method of producing sulfurized tall oil which comprises melting a quantity of elemental sulfur equal to from 3 to 15% of the weight of the tall oil to be treated, dissolving the molten sulfur in a tall oil containing less than 46% rosin acids and which has been preheated to a temperature above 235° F., maintaining the reaction mass at a temperature between 250° and 300° F. for a sufficient time to effect substantially complete reaction of the sulfur and the tall oil as determined by clarity point tests, and within two hours after reaching the clarity point, cooling the reaction mass to 190° F.

4. The method of producing sulfurized tall oil which comprises dissolving sulfur in a tall oil containing less than 46% rosin acids heated to a temperature above 235° F., said sulfur constituting from 3 to 15% of the weight of the tall oil, maintaining the reaction mass at a temperature between 250° and 300° F. for a sufficient time to effect substantially complete reaction of the sulfur and tall oil as determined by clarity point tests, and within two hours after reaching the clarity point, cooling the reaction mass to 190° F.

References Cited in the file of this patent

UNITED STATES PATENTS 2,198,562     Pollak et al.            Apr. 23, 1940

OTHER REFERENCES

Pollak: Oil and Soap J., page 87 (April 1940).